Dec. 13, 1932.　　　M. AFLAGUE　　　1,890,892
STABILIZING SPRING SUSPENSION SYSTEM
Filed Jan. 3, 1931
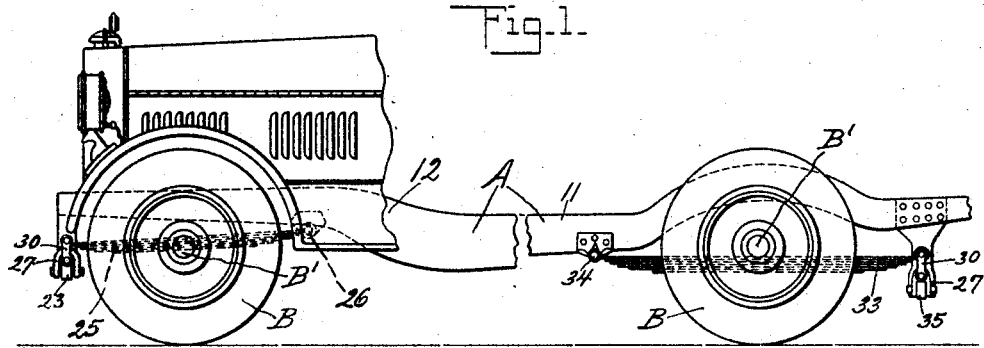
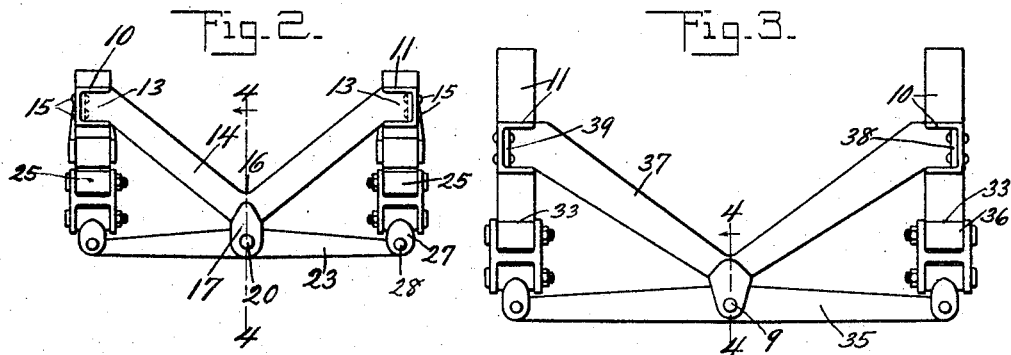
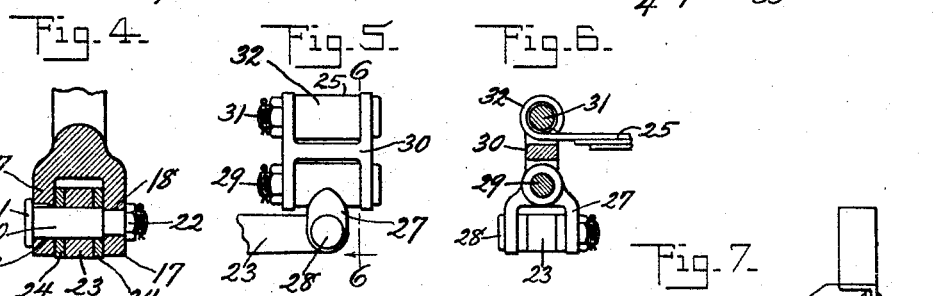
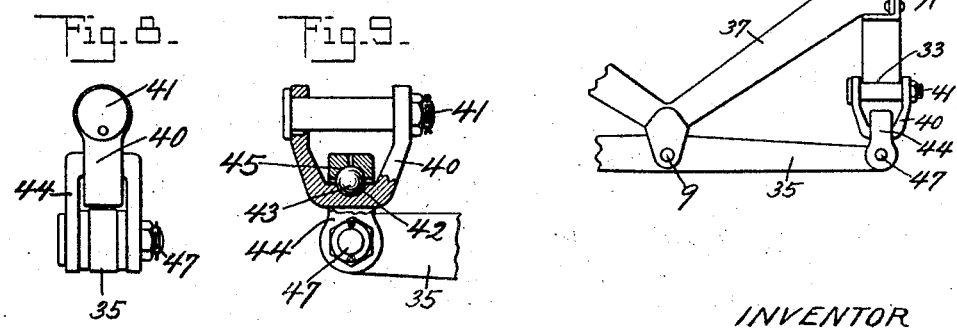
INVENTOR
Manuel Aflague
BY F. H. Gibbs
ATTORNEY Patented Dec. 13, 1932

1,890,892

UNITED STATES PATENT OFFICE

MANUEL AFLAGUE, OF DETROIT, MICHIGAN, ASSIGNOR TO AMERICAN CAR AND FOUNDRY MOTORS COMPANY, OF NEW YORK, N. Y., A CORPORATION OF DELAWARE

STABILIZING SPRING SUSPENSION SYSTEM

Application filed January 3, 1931. Serial No. 506,404.

This invention relates to spring suspensions for the chassis of motor vehicles and involves more particularly the provision of means for equalizing the action of the springs on each side of the vehicle.

Present-day practice in this art may be typically described as mounting the springs on one side of the vehicle independently of those on the other side. As a result any jolt or jar which may be imparted to the wheel on one side of the frame is transmitted to the spring and is partially taken up therein and transmitted to the respective side of the chassis frame. It is evident, therefore, that the chassis frames of vehicles are subject to twisting stresses and the bodies carried thereby must therefore be of sufficiently rigid structure to withstand such stresses. With the above in mind this invention has in view as an important object the provision of supporting means for the chassis of motor vehicles which include equalizing means whereby the stresses on one spring are partially transmitted to the other so that the stresses are substantially equalized between the springs on each side of the vehicle.

The invention provides means whereby each wheel is freely movable in a vertical direction without causing a corresponding elevation or depression in that part of the chassis contiguous thereto thereby contributing greatly to the stability of a freight or passenger carrying body mounted on said chassis.

More in detail the invention contemplates a construction wherein the supporting springs are supported relatively midway their length upon axles, are connected at one end to the side frame members of the chassis and at their opposite ends are connected by suitable shackles to opposite ends of rigid transversely extending equalizers or frame supporting bars on which the end sills of the chassis are pivotally supported to permit relative independent rocking motion between the individual wheels and the chassis or the chassis and a body carried thereby. For convenience of operation the said end sills are formed as relatively V-shaped brackets pivoted, as illustrated in the drawing, upon the equalizers and depending below the normal plane of the side frame members as best illustrated in Figs. 2 and 3 of the drawing so as to provide sufficient clearance between the shackles supporting the transverse equalizers and the end portions of the side frame members to permit a considerable amount of vertical movement of either or both ends of the equalizers without contact with said side frame members.

A construction made in accordance with the precepts of this invention presents the advantage of permitting of lighter body structures on the chassis owing to the fact that the latter are not subject to the twists and strains heretofore placed thereon by the prior art suspensions. Moreover, comparative longevity is imparted to the tires as the vehicle as a whole may be of a lighter construction than has heretofore been the case. The springs themselves may be of a lighter and more flexible structure owing to the fact that any one spring is never subject to the full effects of any jolt or jar. Other more detailed objects and advantages of the invention are associated with the provision of connecting means between the extremities of the equalizing bar and the spring ends, also in connection with the mounting of the equalizing means. These will in part become apparent and in part hereinafter stated as the description of the invention proceeds.

For a full and more complete understanding of the invention, reference may be had to the following description and accompanying drawing wherein similar reference characters designate corresponding parts and in which:

Figure 1 is a fragmentary view in side elevation with parts broken away of a motor vehicle chassis including spring suspension means made in accordance with the precepts of this invention.

Fig. 2 is a front end view of the chassis frame and spring suspension means.

Fig. 3 is a rear end view similar to Fig. 2.

Fig. 4 is an enlarged detailed section taken about on the plane represented by the line 4—4 of Figs. 2 and 3.

Fig. 5 is a view showing elevation of one of the connections between the equalizing bar and the spring extremity.

Fig. 6 is a detailed section taken about on the plane represented by the line 6—6 of Fig. 5.

Figs. 7, 8 and 9 are views bringing out the construction of a modified form of connection between the equalizing bar and the springs.

Referring to the drawing, more particularly to Fig. 1 the chassis is indicated generally at A and comprises a pair of side frame members 10 and 11 of the conventional channel shape in cross section.

Wheels B carry the axles B' and supported by the axles are springs as 25 and 33, each of which is connected at one end to one of the side frame members 10—11 as indicated at 26 and 34 in Fig. 1. The opposite end of each spring is pivotally connected with a transversely extending supporting and equalizing bar, as 23 or 35, the former representing the equalizer at the front end of the chassis and the latter the equalizer at the rear end of the chassis.

The end portions of the side frames are connected by end sills in the form of rockable brackets 14 and 37 which are connected with the equalizers 23—35 by means of pins 20 and 9.

As the equalizers are supported by the extreme forward and rear ends of the springs 25 and 33 through suitable shackles 27, 28, 29, 30 and 31, illustrated in detail in Figs. 5 and 6, it is obvious that when the pins 20—9 connect the rockable brackets 14—37 to the equalizers 23—35 a considerable proportion of the load is transmitted to the ends of the springs contiguous to said equalizers.

It is also obvious that due to the nearly direct connection of the springs and side frame members at only one end of each spring and the indirect rockable connection of the springs through the shackles, equalizer and rockable bracket at the opposite ends of each spring a considerable greater freedom of movement of each wheel relative to the chassis is permissible than if the springs were connected at each end directly to the side frame members or through direct shackle connection therewith.

The rockable supporting brackets referred to may be of any convenient shape in cross section but are preferably flanged and connected directly to the webs of the side channel frame members, as shown at 13—15 in Fig. 2 and at 38—39, Fig. 3. Near the apices of the rockable brackets they are perforated for the reception of the supporting pins 9—20 and in Fig. 4 is illustrated the connection of one rockable bracket, in this instance the front bracket, with equalizer 23, the pin 20 passing through the bifurcated lower portion 17 of the rocker and through the equalizer 23 and the spacers 24 interposed between the equalizer and the member 17.

The operation of the foregoing spring suspension is thought to be self-evident. Assuming that an obstacle is encountered by one of the front wheels the shock will be transmitted through the spring associated with the wheel receiving the shock, to the equalizing member 23 and to the other spring associated with the wheel which has not received the shock. With this arrangement both of the springs are adapted to receive the shock and the chassis frame is rendered free of the twisting effects normally encountered.

Figs. 7, 8 and 9 illustrate a modified form of shackle connections between the ends of the equalizing bar and the springs. These are in the form of a ball shackle and comprise a U-shaped member 40 which is connected by a pin 41 to the end of the spring and which is formed with a recess 42 in which is fitted a ball bearing member 43, the latter supporting the loop portion of the shackle member 44 by fitting in a recess 45 therein. This shackle member 44 at its lower end is provided with a pivotal means for connecting it to the equalizing bar as shown at 47. This arrangement is advantageous in that it provides for free swinging movement between the equalizing bar and the spring extremities. The equalizer bars 23 and 35 are each suspended below the contiguous ends of the springs 25 and 33 and, as illustrated in the drawing, are normally carried in planes lower than the axles B' thereby materially lowering the center of gravity of a vehicle carried thereby and correspondingly contributing to its safety.

While a preferred specific embodiment of the invention is hereinbefore set forth, it is to be understood that I am not to be limited to the exact construction illustrated and described because various modifications of the details may be provided in putting the invention into practice within the purview of the appended claims.

What is claimed is:

1. In a spring support for a vehicle, a frame comprising longitudinal members, front and rear wheeled axles under the frame, a substantially V-shaped transverse member at each end of the frame, rigid equalizer members for supporting and permitting rocking movement of said transverse members thereon and pivotally connected to said transverse members in a plane at least as low as the center line of said axles, springs supported by said axles at each side of the frame, each connected at one end with a longitudinal member, and right-angular shackle connections for universally connecting the other end of each of said springs to an adjacent end of said equalizer member.

2. In a spring suspension device of the character described, a frame, front and rear wheeled axles under the frame, said frame having longitudinal side members and a V-shaped transverse bracket member connecting the side members at each end thereof and depending below said axles, a rigid equalizer member pivoted to said transverse members at points below said axles, springs supported by the axles at each side of the frame, means for pivotal connections between the springs and frame, and universal connections of the springs to the ends of the equalizer members.

In witness whereof I have hereunto set my hand.

MANUEL AFLAGUE.